Dec. 3, 1968   L. J. SHELDRAKE ET AL   3,414,800
DIRECT CURRENT COMMUTATION SYSTEM FOR BRUSHLESS
ELECTRICAL MOTORS
Filed Oct. 7, 1965
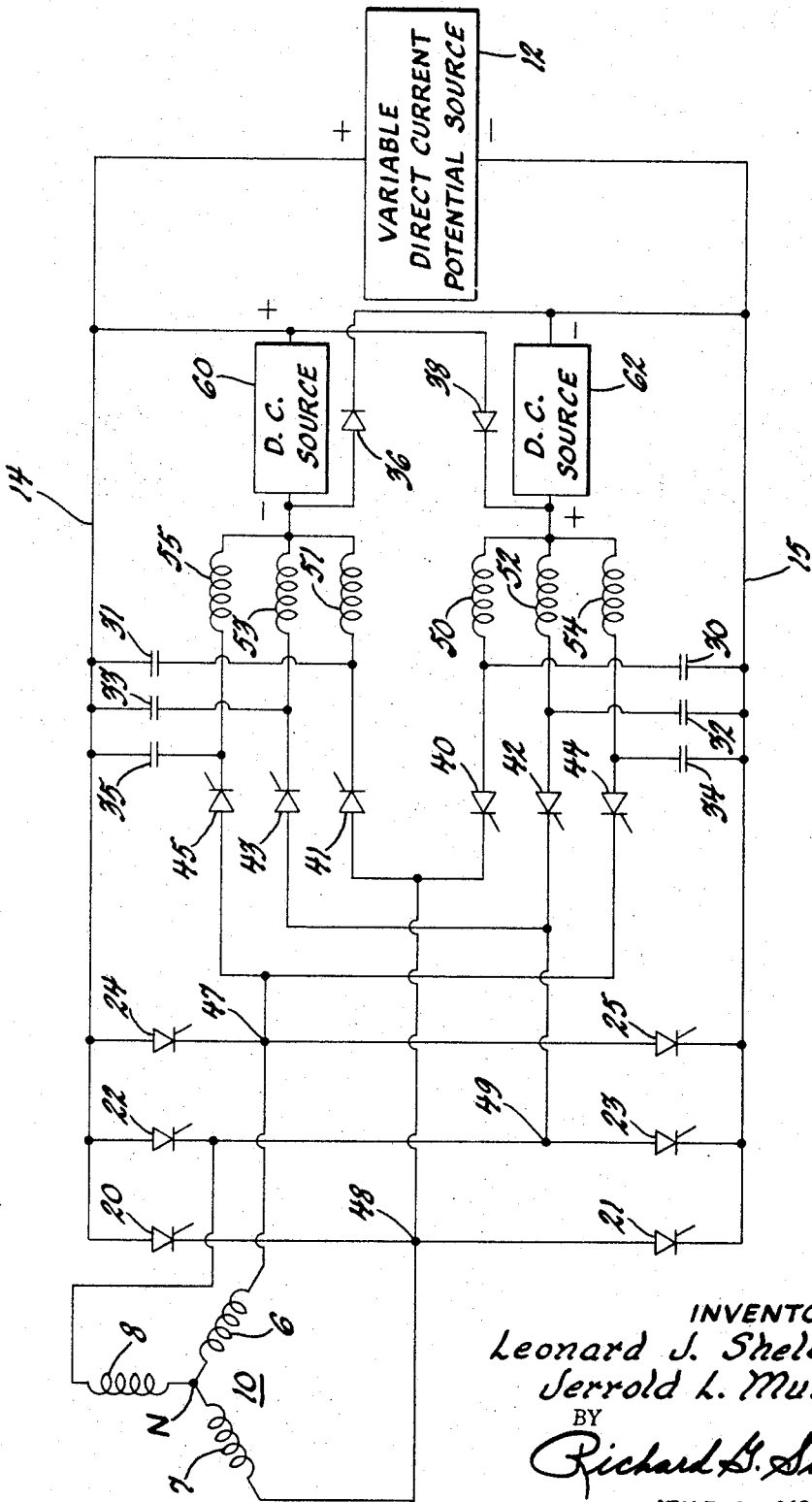
INVENTORS
Leonard J. Sheldrake
Jerrold L. Mullen
BY
Richard H. Stahr
THEIR ATTORNEY United States Patent Office 3,414,800
Patented Dec. 3, 1968

3,414,800
DIRECT CURRENT COMMUTATION SYSTEM FOR BRUSHLESS ELECTRICAL MOTORS
Leonard J. Sheldrake and Jerrold L. Mullen, Anderson, Ind., assignors to General Motors Corporation, Detroit, Mich., a corporation of Delaware
Filed Oct. 7, 1965, Ser. No. 493,662
5 Claims. (Cl. 321—5)

The present invention relates to a direct current commutation system for brushless type electrical motors and, more specifically, to an electrical charge storage device charging circuit in combination with a direct current commutation system.

Recently, there has been increased activity in the development of electrical motor propulsion systems. For this application, the most desirable electrical motor is one which produces a high torque under stall and low speed conditions and which is capable of operation at very high speeds. These two requirements are somewhat contradictory, at least when considering conventional machines. The high stall torque is characteristic of direct current motors while the high speed capability is generally attainable only in alternating current motors with no brushes or commutator. An ideal propulsion motor for high speed applications would be one which has the high speed capabilities of an alternating current motor without the commutator and brush limitations inherent in direct current motors. Therefore, a logical selection would be an alternating current polyphase motor commutated as a direct current motor but without a commutator or brushes. That is, a brushless direct current commutated alternating current motor.

As is well known in the art, the armature of a direct current motor is rotated by the force produced by two interacting fields of magnetic flux which are produced by current flow through the field coils and the armature coils. In conventional machines, the magnetic poles resulting from current flow through the field coils are stationary and the magnetic poles produced by current flow through the armature coils tend to pull into alignment with the field magnetic poles. However, as the armature magnetic poles produced by current flow through any armature coil approaches alignment with the field magnetic poles, the commutator and brushes switch armature current from that coil to the next succeeding coil and the armature magnetic poles thereby produced tend to pull into alignment with the field poles. If this switching action by the commutator and brushes is performed at the proper shaft position, the armature will be rotated by the force produced as the armature poles of successive armature coils tend to pull into alignment with the field poles.

Armature or rotor rotation may also be produced by effectively rotating the magnetic poles produced by current flow through the field coils which tend to pull the poles produced by current flow through the armature coils therealong. This essentially rotating magnetic field may be produced by successively energizing the stator windings of a polyphase alternating current motor at the proper shaft positions from a direct current potential source.

One system of this type employs a polyphase alternating current induction type machine, a solid state commutation system and a triggering system which is coupled to the output shaft of the motor.

The commutation system successively energizes the stator windings of the polyphase alternating current motor at the proper shaft positions from a direct current potential source, therefore, the commutation system performs the function normally accomplished by the commutator and brushes of a direct current motor.

Most direct current commutation systems for brushless type electrical motors are comprised of at least a bridge type commutating switching circuit including a positive and a negative polarity bank of silicon controlled rectifier commutating switching devices which are connected across the positive and negative polarity terminals of the main direct current potential source and which are extinguished by electrical charges stored in corresponding electrical charge storage devices.

The electrical charge stored in each electrical charge storage device of the direct current commutation system must be supplied by the main direct current potential source, one or more auxiliary charging direct current potential sources or a combination of these two direct current potential sources. Under stall or low speed conditions, the terminal potential of the main direct current potential source may reduce to a value of insufficient magnitude to place a sufficient charge upon the electrical charge storage devices. Therefore, it is usually desirable to provide one or more auxiliary charging direct current potential sources to insure that each electrical charge storage device receives and stores an electrical charge of sufficient magnitude to positively extinguish the corresponding silicon controlled rectifier commutating switch.

In certain instances, it may be expedient to connect each auxiliary charging direct current potential source in parallel with the main direct current potential source to supply the charge for the electrical charge storage devices.

It is therefore, an object of this invention to provide an improved direct current commutation system for brushless type electrical motors.

It is another object of this invention to provide an improved electrical charge storage device charging circuit in combination with a direct current commutation system for brushless type electrical motors.

In accordance with this invention, an improved direct current commutation system for brushless type electrical motors is provided wherein at least one auxiliary charging direct current potential source is connected in parallel with the main direct current potential source for placing a charge on each of a plurality of electrical charge storage devices under stall or low speed operating conditions and is effectively disconnected from the charging circuit under normal operating conditions.

For a better understanding of the present invention, together with additional objects, advantages and features thereof, reference is made to the following description and accompanying single figure drawing which sets forth in schematic form a direct current commutation system for brushless type electrical motors including the novel electrical charge storage device charging circuit of this invention.

Referring to the figure, direct current power is supplied by a main direct current potential source which may be a conventional variable direct current potential source 12 connected across the positive polarity input circuit line 14 and the negative polarity input circuit line 15 of the direct current commutation system, as indicated. As the main direct current power source may be a variable direct current potential source of conventional design and forms no part of this invention, it has been shown in block form in the figure.

The stator coils 6, 7 and 8 of the motor generally shown at 10 are schematically set forth in the figure. Although stator coils 6, 7 and 8 have been indicated in the drawing to be connected in a Y configuration, it is to be specifically understood that the novel commutation system of this invention is equally applicable to stator coils connected in a delta configuration. The coils 6, 7 and 8 are not to be construed as single coils but as a schematic representation of all coils included in the respective phases. Throughout the specification, the end of each of coils 6, 7 and 8 which is not connected to the electrical neutral point "N" will be referred to as the terminal end.

To properly energize coils 6, 7 and 8, a bridge type commutating switching circuit, having a positive and a negative polarity bank of silicon controlled rectifier commutating switching devices is provided and is connected across input circuit lines 14 and 15. In the figure, this bridge type commutating switching circuit comprises silicon controlled rectifiers 20, 21, 22, 23, 24 and 25.

The silicon controlled rectifier is a semi-conductor device having a control electrode, generally termed the gate electrode, and two current carrying electrodes, generally refered to as the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. Upon being triggered to conduction, however, the control electrode is no longer capable of affecting the device, which will remain in the conducting state until either the anode-cathode circuit is interrupted or the polarity of the potential applied across the anode-cathode electrodes is reversed. Of these two alternatives, the reversal of the polarity of the potential across the anode-cathode electrodes thereof is perhaps the most satisfactory.

Included in the positive polarity bank of the commutating switching circuit are the three silicon controlled rectifier commutating switches having the anode electrodes connected to positive polarity input circuit line 14 and included in the negative polarity bank of this switching circuit are the three silicon controlled rectifier commutating switches having the cathode electrodes connected to the negative polarity input circuit line 15. That is, silicon controlled rectifier commutating switches 20, 22 and 24 comprise the positive polarity bank of commutating switches and silicon controlled rectifier commutating switches 21, 23 and 25 comprise the negative polarity bank of commutating switches.

Corresponding to each one of the silicon controlled rectifier commutating switches of the bridge type commutating switching circuit is an electrical charge storage device in which an electrical charge may be stored and which may be used to extinguish the corresponding silicon controlled rectifier commutating switch. These electrical charge storage devices have been shown in the figure as capacitors 30, 31, 32, 33, 34 and 35 which correspond to respective silicon controlled rectifier commutating switches 20, 21, 22, 23, 24 and 25 of the commutating switching circuit.

To charge the capacitors corresponding to those silicon controlled rectifier commutating switches included in the positive polarity bank of commutating switches in the commutating switching circuit under stall or low speed conditions is a first auxiliary charging source of direct current potential 62. To charge the capacitors corresponding to those silicon controlled rectifier commutating switches included in the negative polarity bank of commutating switches of the commutating switching circuit under stall or low speed conditions is another auxiliary charging source of direct current potential 60. As these auxiliary charging direct current potential sources may be of conventional design and form no part of the invention, they have been shown in block form in the figure.

Those capacitors corresponding to the commutating switching devices included in the positive polarity bank of the bridge type commutating switching circuit are connected in parallel across the main direct current potential source and the corresponding auxiliary charging direct current potential source. Those capacitors corresponding to the commutating switching devices included in the negative polarity bank of the bridge type commutating switching circuit are connected in parallel across the main direct current potential source and the other auxiliary charging direct current potential source.

Capacitors 30, 32 and 34, corresponding to respective silicon controlled rectifier commutating switches 20, 22 and 24 included in the positive polarity bank of commutating switches in the commutating switching circuit, are connected in parallel across auxiliary charging direct current potential source 62 and main direct current potential source 12 through respective series charging inductors 50, 52 and 54. Capacitors 31, 33 and 35, coresponding to respective silicon controlled rectifier commutating switches 21, 23 and 25 included in the negative polarity bank of commutating switches in the commutating switching circuit, are connected in parallel across auxiliary charging direct current potential source 60 and main direct current potential source 12 through respective series charging inductors 51, 53 and 55.

To substantially double the charge upon each electrical charge storage device compared to the source supplying it, an inductor element is included in the charging circuitry to provide a resonant circuit.

To isolate the auxiliary charging direct current potential sources 60 and 62 from the positive and negative polarity banks of commutating switching devices under high speed conditions, a first unidirectional current translating device is included in the charging circuit for capacitors 30, 32 and 34 and is connected in series between the positive polarity terminals of the main direct current potential source 12 and the corresponding auxiliary charging direct current potential source 62 and a second unidirectional current translating device is included in the charging circuit for capacitors 31, 33 and 35 and is connected in series between the negative polarity terminals of the main direct current potential source 12 and the other auxiliary charging direct current potential source 60. These unidirectional current translating devices may be conventional diodes.

In the drawing, diode 36 is connected in series between the negative polarity terminal of main direct current potential source 12 and the negative polarity terminal of auxiliary charging direct current potential source 60 and diode 38 is connected in series between the positive polarity terminal of main direct current potential source 12 and the positive polarity terminal of auxiliary charging direct current potential source 62.

The electrical charge on capacitors 30, 31, 32, 33, 34 and 35 must be of a sufficient magnitude to extinguish the corrsponding silicon controlled rectifier commutating switches, this magnitude being determined by the current flowing through these switches, and, in any event, this charge must be of a magnitude greater than the potential of main direct current potential source 12 at all times. Therefore, auxiliary direct potential sources 60 and 62 must be selected to have a potential of a magnitude which will satisfy the two requirements. With the series inductors included in the charging circuit of each capacitor, the magnitude of the charge upon these devices may be as much as 1.8 times supply potential.

So that each silicon controlled rectifier commutating switch may be selectively extinguished, provision is made for selectively diverting the current flowing through the anode-cathode electrodes of each silicon controlled rectifier commutating switch of the commutating switching circuit toward the opposite power supply line. To establish a diverting circuit, there is provided a controllable extinguishing switching device, of the type having at least two current carrying electrodes and a control electrode and being of the type which, when forward poled, may be triggered to conduction upon the application of a proper polarity signal pulse to the control electrode thereof, corresponding to each silicon controlled rectifier commutating switch.

These controllable extinguishing switching devices are indicated in the figure as silicon controlled rectifier extinguishing switches 40, 41, 42, 43, 44 and 45 which correspond to respective silicon controlled rectifier commutating switches 20, 21, 22, 23, 24 and 25.

Each commutating switching device, the corresponding electrical charge storage device and the corresponding extinguishing switching device are interconnected in such a manner that the current flowing through each silicon controlled rectifier commutating switch is diverted toward the opposite supply line when the corresponding extinguishing switching device is triggered to conduction. Specifically, the series combination of a capacitor and the anode and cathode electrodes of a silicon controlled rectifier extinguishing switch is connected between the anode electrode of each silicon controlled rectifier in the negative polarity bank and the positive polarity power supply line and between the cathode electrode of each silicon controlled rectifier in the positive polarity bank and the negative polarity power supply line. In this figure, for example, the series combination of capacitor 35 and the anode-cathode electrodes of silicon controlled rectifier extinguishing switch 45 is connected between the anode electrode of silicon controlled rectifier commutating switch 25 and positive polarity supply line 14.

The triggering system, previously mentioned, relates the switching action of the commutation system to shaft position, as does the commutator in a conventional direct current motor, and produces electrical switching signal pulses at the proper motor shaft positions to trigger to conduction at each shaft position the proper silicon controlled rectifier commutating switch which will complete an energizing circuit from main direct current power source 12 to the corresponding stator coils of motor 10 and to trigger to conduction the proper silicon controlled rectifier extinguishing switch at each shaft position to complete the extinguishing circuit previously described to extinguish the proper conducting silicon controlled rectifier commutating switch. For example, assuming that the motor 10 is running and that silicon controlled rectifier commutating switches 24 and 21 are conducting, stator coils 6 and 7 are energized through a circuit which may be traced from positive polarity input circuit line 14 through conducting silicon controlled rectifier commutating switch 24, motor windings 6 and 7 and conducting silicon controlled rectifier commutating switch 21 to negative polarity input circuit line 15. At the next motor shaft position at which it is necessary to energize another stator coil pair, the triggering system produces, substantially simultaneously, a switching signal pulse which will trigger silicon controlled rectifier commutating switch 22 to conduction and a switching signal pulse which will trigger silicon controlled rectifier extinguishing switch 44 to conduction.

As silicon controlled rectifier extinguishing switch 44 begins conducting, current flow therethrough rapidly increases from the positive polarity plate of capacitor 34 through motor coils 6 and 7 and conducting silicon controlled rectifier commutating switch 21 to negative polarity input circuit line 15. As the flow through conducting silicon controlled rectifier extinguishing switch 44 increases, there is a corresponding rapid decrease of current flow through silicon controlled rectifier commutating switch 24.

The current flow through conducting silicon controlled rectifier 44 results in a potential at junction 47 which becomes increasingly more positive. As the positive polarity plate of capacitor 34 is more positive than positive polarity input circuit line 14, current tends to flow in a reverse direction through silicon controlled rectifier commutating switch 24 from junction 47 toward positive polarity input circuit line 14. This reverse current through conducting silicon controlled rectifier commutating switch 24 quickly extinguishes this device.

At the next motor shaft position at which it is necessary to energize another stator coil pair, the triggering system produces, substantially simultaneously, a switching signal pulse which will trigger silicon controlled rectifier commutating switch 25 to conduction and a switching signal pulse which will trigger silicon controlled rectifier extinguishing switch 41 to conduction.

As silicon controlled rectifier extinguishing switch 41 begins conducting, current flow therethrough rapidly increases into the negative polarity plate of capacitor 31 through conducting silicon controlled rectifier commutating switch 22 and motor coils 8 and 7. As the flow through conducting silicon controlled rectifier extinguishing switch 41 increases, there is a corresponding rapid decrease of current flow through silicon controlled rectifier commutating switch 21.

The current flow through conducting silicon controlled rectifier 41 results in a potential at junction 48 which becomes increasingly more negative. As the negative polarity plate of capacitor 31 is more negative than negative polarity supply line 15, current tends to flow in a reverse direction through silicon controlled rectifier commutating switch 21 from negative polarity supply line 15 toward junction 48 and positive polarity input circuit line 14. This reverse current through conducting silicon controlled rectifier commutating switch 21 quickly extinguishes this device.

At the next motor shaft position at which it is necessary to energize another stator coil pair, the triggering system produces, substantially simultaneously, a switching signal pulse which will trigger silicon controlled rectifier commutating switch 20 to conduction and a switching signal pulse which will trigger silicon controlled rectifier extinguishing switch 42 to conduction.

As silicon controlled rectifier extinguishing switch 42 begins conducting, current flow therethrough rapidly increases from the positive polarity plate of capacitor 32 through motor coils 8 and 6 and conducting silicon controlled rectifier commutating switch 25 to negative polarity input circuit line 15. As the flow through conducting silicon controlled rectifier extinguishing switch 42 increases, there is a corresponding rapid decrease of current flow through silicon controlled rectifier commutating switch 22.

The current flow through conducting silicon controlled rectifier 42 results in a potential at junction 49 which becomes increasingly more positive. As the positive polarity plate of capacitor 32 is more positive than positive polarity input circuit line 14, current tends to flow in a reverse direction through silicon controlled rectifier commutating switch 22 from junction 49 toward positive polarity input circuit line 14. This reverse current through conducting silicon controlled rectifier commutating switch 22 quickly extinguishes this device.

This action may be traced through a complete cycle and it is apparent that the combination of the triggering system and the commutating switching system operate to energize successive coil pairs, thereby producing a substantially rotating magnetic field in the stator windings of motor 10.

As the triggering system forms no part of this invention, it has not been set forth in detail in this specification. It is only necessary that a triggering system which will provide the necessary trigger signals for the commutating and extinguishing switches at the proper times be provided.

In this commutating circuit, the charge upon each of the extinguishing capacitors is applied across the main direct current potential source 12 and the corresponding silicon controlled rectifier commutating switch in series, in a manner previously described. Therefore, the charge upon each extinguishing capacitor must be of a potential higher than the potential of main direct current potential source 12 at all times. Therefore, the charging inductors are included to provide a resonant charging circuit for each extinguishing capacitor.

At stall and low speed conditions, the terminal potential of main direct current potential source 12 may be of an insufficient magnitude to provide an adequate charge upon the extinguishing capacitors. Therefore, the auxiliary charging direct current potential sources 60 and 62 are provided to supply the extinguishing capacitor charge under these conditions. At higher motor speeds and, consequently, higher main direct current potential source potentials, the energy handled by these capacitors becomes large. It is more desirable to charge the extinguishing capacitors from the main direct current potential source 12 under these conditions and, therefore, the potential rating of auxiliary charging direct current potential sources 60 and 62 may be considerably less than that of main direct current potential source 12.

With the rotor of motor 10 stalled or running at a low speed, the terminal potential of main direct current potential source 12 is of a low magnitude. Under these conditions, extinguishing capacitors 31, 33 and 35 are charged by auxiliary charging direct current potential source 60 and extingiushing capacitors 30, 32 and 34 are charged by auxiliary charging direct current potential source 62.

As the speed of the rotor of motor 10 increases, the terminal potential of main direct current potential source 12 also increases until it reaches a magnitude equal to or greater than the terminal potential of auxiliary charging direct current potential sources 60 and 62. With the terminal potential of main direct current potential source 12 of a magnitude equal to or greater than the terminal potential of auxiliary charging direct current potential sources 60 and 62, these sources are reverse biased and, consequently, provide no charging current and are, therefore, effectively removed from the extinguishing capacitor charging circuitry. Under these conditions, extinguishing capacitors 31, 33 and 35 are charged by main direct current potential source 12 through conducting diode 36 and extingiushing capacitors 30, 32 and 34 are charged by main direct current potential source 12 through conducting diode 38.

It may be noted that should diodes 36 and 38 be removed from this circuit, auxiliary charging direct current potential sources 60 and 62 would be connected in parallel across lines 14 and 15 at all times. Therefore, the potential across lines 14 and 15 could never be reduced to a magnitude less than the rated potential of these two sources. As it is mandatory that the potential across lines 14 and 15 and the bridge type commutating switches be reduced to a value lower than this under certain conditions, these diodes are inserted in the circuit to isolate auxiliary charging direct current potential sources 60 and 62 from the positive and negative polarity banks of silicon controlled rectifier commutating switches.

As it is desirable to place the maximum available charge upon each of the extinguishing capacitors to insure that the corresponding silicon controlled rectifier commutating switch is extinguishing every time and since it is also desirable to supply the charge for the extinguishing capacitors from the main direct current potential source under high potential conditions, the potential controlled automatic connection of the auxiliary charging direct current potential sources into the extinguishing capacitor charging circuitry under stall and low speed conditions and effective disconnection thereof from the extinguishing capacitor charging circuitry under normal or high potential conditions is an extremely desirable feature.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. In a direct current commutation system for brushless type electrical motors comprising at least a bridge type commutating switching circuit including a positive and a negative polarity bank of silicon controlled rectifier commutating switching devices connected across the positive and negative polarity terminals of a main direct current potential source and a plurality of electrical charge storage devices, each corresponding to one of said commutating switching devices, for storing an electrical charge, the combination with said electrical charge storage devices of first and second auxiliary charging direct current potential sources, first circuit means for connecting those said electrical charge storage devices corresponding to the said commutating switching devices included in said positive polarity bank across said main direct current potential source and one of said auxiliary charging direct current potential sources, second circuit means for connecting those said electrical charge storage devices corresponding to the said commutating switching devices included in said negative polarity bank across said main direct current potential source and the other one of said auxiliary charging direct current potential sources and a unidirectional current translating device included in each said first and second circuit means for isolating said auxiliary charging direct current potential sources from said positive and negative banks of commutating switching devices.

2. The direct current commutation switching system described in claim 1 wherein said unidirectional current translating devices are diodes.

3. In a direct current commutation system for brushless type electrical motors comprising at least a bridge type commutating switching circuit including a positive and a negative polarity bank of controllable commutating switching devices connected across the positive and negative polarity terminals of a main direct current potential source and a plurality of electrical charge storage devices, each corresponding to one of said commutating switching devices, for storing an electrical charge, the combination with said electrical charge storage devices of a first and a second auxiliary charging direct current potential source, first circuit means for connecting those said electrical charge storage devices corresponding to the said commutating switching devices included in said positive polarity bank across said main direct current potential source and said first auxiliary charging direct current potential source, said first circuit means including a first unidirectional current translating device connected in series between the negative polarity terminals of said main direct current potential source and said first auxiliary charging direct current potential source and second circuit means for connecting those said electrical charge storage devices corresponding to the said commutating switching devices included in said negative polarity bank across said main direct current potential source and said second auxiliary charging direct current potential source, said second circuit means including a second unidirectional current translating device connected in series between the positive polarity terminals of said main direct current potential source and said second auxiliary charging direct current potential source.

4. The direct current commutation system described in claim 3 wherein said first and second unidirectional current translating devices are diodes.

5. In a direct current commutation system for brushless type electrical motors comprising at least a bridge type commutating switching circuit including a positive and a negative polarity bank of controllable commutating switching devices connected across the positive and negative polarity terminals of a main direct current potential source and a plurality of electrical charge storage devices, each corresponding to one of said commutating switching devices, for storing an electrical charge, the combination with said electrical charge storage devices of a first and a second auxiliary charging direct current potential source, first and second diodes each having an anode and a cathode electrode, first circuit means for connecting those said electrical charge storage devices corresponding to the said commutating switching devices included in said positive polarity bank across said main direct current potential source and said first auxiliary charging direct current potential source, said first circuit means including one of said diodes having said cathode electrode connected to the negative polarity terminal of said main direct current potential source and said anode electrode connected to the negative polarity terminal of said first auxiliary charging direct current potential source and second circuit means for connecting those said electrical charge storage devices corresponding to the said commutating switching devices included in said negative polarity bank across said main direct current potential source and said second auxiliary charging direct current potential source, said second circuit means including the other one of said diodes having said anode electrode connected to the positive polarity terminal of said main direct current potential source and said cathode electrode connected to the positive polarity terminal of said second auxiliary charging direct current potential source.

References Cited

UNITED STATES PATENTS

| | | | |
|---|---|---|---|
| 3,213,287 | 10/1965 | King | 307—71 |
| 3,262,036 | 7/1966 | Clarke et al. | 318—227 XR |
| 3,340,453 | 9/1967 | Bradley et al. | 321—5 |
| 3,354,370 | 11/1967 | Corry et al. | 318—227 |

JOHN F. COUCH, *Primary Examiner.*

W. M. SHOOP, JR., *Assistant Examiner.*